(12) United States Patent
Murphy

(10) Patent No.: US 6,884,964 B2
(45) Date of Patent: Apr. 26, 2005

(54) METHOD OF WELD REPAIRING A COMPONENT AND COMPONENT REPAIRED THEREBY

(75) Inventor: John Thomas Murphy, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 249 days.

(21) Appl. No.: 10/248,323

(22) Filed: Jan. 9, 2003

(65) Prior Publication Data
US 2004/0134887 A1 Jul. 15, 2004

(51) Int. Cl.⁷ .............................. B23K 9/04; B23P 6/04
(52) U.S. Cl. .............................. 219/137 R; 219/121.17; 219/121.66; 29/889.1; 228/119
(58) Field of Search .................... 219/137 R, 121.17, 219/121.66; 228/119; 29/889.1, 402.01, 402.09; 164/92.1

(56) References Cited

U.S. PATENT DOCUMENTS 4,832,252 A * 5/1989 Fraser ........................ 228/119
5,071,054 A * 12/1991 Dzugan et al. ............. 228/119
6,508,000 B1 * 1/2003 Burke et al. ................ 29/889.1
6,568,077 B1 * 5/2003 Hellemann et al. ........ 29/889.1

FOREIGN PATENT DOCUMENTS

GB 2 233 923 * 1/1991 ............. B23P/6/04

* cited by examiner

Primary Examiner—Kiley Stoner
Assistant Examiner—Kevin P. Kerns
(74) Attorney, Agent, or Firm—Ernest Cusick; Gary M. Hartman; Domenica N. S. Hartman

(57) ABSTRACT

The method of repairing a metal alloy component, and the resulting repaired component. The method involves machining the component surface to remove a defect, and then placing in the resulting surface cavity a filler insert whose size and shape are predetermined so that the welding operation can be carried out to completely melt the insert while minimizing the melting of the component immediately surrounding the insert. As such, minimum mixing occurs between the materials of the insert and the component, thereby reducing the risk of cracking following the welding operation.

26 Claims, 3 Drawing Sheets

METHOD OF WELD REPAIRING A COMPONENT AND COMPONENT REPAIRED THEREBY

BACKGROUND OF INVENTION

1. Field of the Invention

The present invention generally relates to methods for weld repairing metal alloys, particularly those suitable for use in the high temperature environment of a gas turbine engine. More particularly, this invention relates to a method of performing a controlled weld repair of a defect in a component formed of such an alloy, wherein the method minimizes melting of the alloy with a filler material used to repair the defect.

2. Description of the Related Art

Hot section components of gas turbine engines, such as blades (buckets), vanes (nozzles) and combustors, are typically formed of nickel, cobalt and iron-base superalloys characterized by desirable mechanical properties at turbine operating temperatures. These components are typically used in cast form, and as a result can have point defects, e.g., ceramic inclusions, pores, etc., as well as small linear defects that require repair. Various welding techniques have been developed that are capable of repairing these defects, including tungsten inert gas (TIG) and plasma transferred arc (PTA) welding processes that must be carefully carried out to achieve acceptable welding yields and ensure that the mechanical properties of the superalloy are maintained. Use is particularly made of relatively simple manual repair methods, such as TIG with a filler material, which can be readily implemented by casting suppliers.

As known in the art, welding involves local melting and resolidification. To prevent cracking, an alloy being repaired by welding must be sufficiently ductile to accommodate the thermal strains that develop during welding. However, temperature resistant materials of the type used in gas turbine engines are inherently resistant to deformation, such that filler materials formed of the same alloy as the component being repaired are difficult to use at room temperature. As a result, alloys more ductile than the parent alloy are frequently used to repair superalloy components. A difficulty encountered when using a ductile filler to repair a superalloy component is that the ratio of filler to parent metal is hard to control in manual processes such as TIG. Frequently, TIG welds of superalloys and other alloys that are difficult to weld will experience cracking in the root passes of the weld due to excessive melting of the parent metal into the molten pool of filler metal.

In view of the above, it would be desirable if a method were available for repairing high-temperature metal alloys, by which excessive melting of the parent metal and mixing with the filler metal could be minimized.

SUMMARY OF INVENTION

The present invention provides a method of repairing a metal alloy component, such as a superalloy component of a gas turbine engine, and the resulting repaired component. The method employs a filler insert whose size and shape are predetermined so that the welding operation can be carried out to completely melt the insert while minimizing the melting of the surrounding metal alloy component. As such, minimum mixing occurs between the insert and the component, thereby reducing the risk of cracking following the welding operation.

The weld repair method of this invention generally comprises performing an evaluation by which the development of a weld melt pool over time in a surface of a body, e.g., a filler metal alloy, is determined so as to correlate melt pool width, depth and shape with time for a set of welding parameters. A component formed of a metal alloy (which may be the same or different than the evaluated body) and having a defect in its surface is then machined to remove the defect and create a cavity in the surface having a width, depth and shape substantially the same as a melt pool width, depth and shape correlated with a time period during the evaluation. The filler insert having approximately the same width, depth and shape as the cavity is then placed in the cavity so that the outer surface of the filler insert is juxtaposed to the cavity surface. Finally, the filler insert is heated using essentially the same set of welding parameters and for the same time period correlated during the evaluation and which served as the basis for sizing both the cavity and the insert. As a result, the filler insert is melted to form a metallurgically-bonded weld repair that fills the cavity.

According to a preferred aspect of the invention, the evaluation is used to determine or estimate the rate at which a melt front propagates through the filler metal alloy, or at least the location of the melt front at different time periods, for a given set of welding conditions and parameters, and this information is used when heating the filler insert so that the melt front that propagates through the insert toward its outer surface will arrive substantially simultaneously at the entire outer surface of the filler insert. Heating may then continue to melt a limited portion of the component beneath the cavity surface, such that the melted portion has a substantially uniform thickness that is intentionally limited to minimize mixing between the materials of the insert and component. As a result, a metal alloy that is relatively difficult to weld, such as a superalloy, can be repaired with an insert formed of an alloy that is more ductile and/or has a lower melting point, yet with a reduced risk of cracking during the welding operation as a result of the reduced amount of mixing in the weld.

From the above, it will be appreciated that various welding techniques can be employed by the method of this invention, such as a manual arc welder or an electron beam, with the same technique being employed during both the evaluation and the welding operation so that the welding parameters can be used to closely control the amount of melting that occurs during the weld repair operation. Furthermore, the evaluation of a metal alloy can be conducted so that multiple melt pool widths, depths and shapes are correlated with multiple time periods for one or more sets of welding parameters. Multiple filler inserts can then be formed to approximately have the widths, depths and shapes identified during the evaluation, allowing a particular filler insert to be selected based on the size of the defect to be repaired. As such, the repair method of this invention is highly suitable for filling cracks, porosity, flaws and other surface voids or damage that may be present in a metal alloy component, and the composition of the filler insert can be tailored to complement the composition of the component being repaired to yield a strong, crack-free weld repair.

Other objects and advantages of this invention will be better appreciated from the following detailed description.

DETAILED DESCRIPTION

Figure 1:
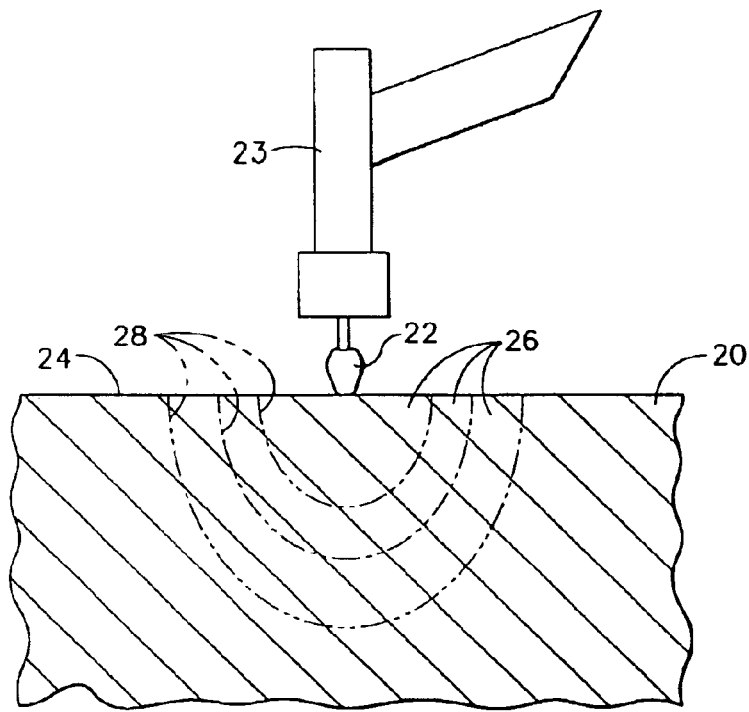
FIG. 1 represents a step performed during an evaluation by which the development of a weld melt pool is determined over time in accordance with this invention.
Figure 2:
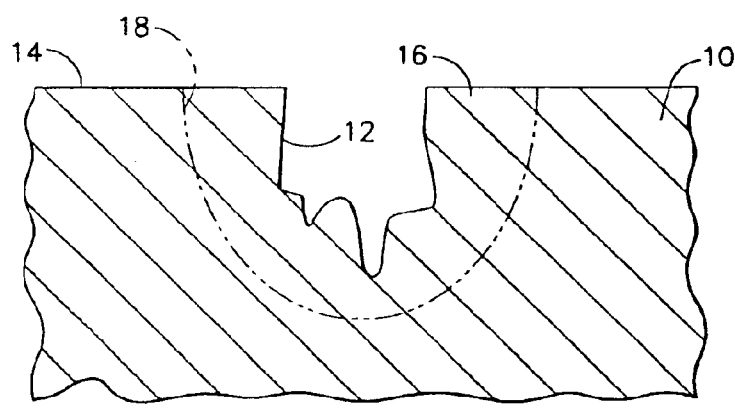
FIG. 2 represents a point defect in a surface of a component.

FIGS. 1 through 5 represent a series of steps carried out to repair a component 10 having a surface defect 12, as represented by FIG. 2. The component 10 may be formed of a variety of metal alloys, including those that are relatively difficult to weld, such as nickel, cobalt and iron-based superalloys used to form cast or forged components of gas turbine engines. If the component 10 is a casting, the defect 12 will typically be a point defect, such as a ceramic inclusion, pore, etc., though the defect 12 could instead be a linear defect.

Representing a first step of this invention, FIG. 1 shows a surface 24 of a metal alloy body 20 being heated with a torch 22 produced by a TIG welder 23, such that a weld melt pool 26 has developed. As would be expected, the melt pool 26 develops over time along a weld melt front 28 that propagates radially outward and downward through the body 20 from a point nearest the torch 22. The final size and shape of the weld melt pool 26 coincides with the farthest extent of the melt front 28 at the time the torch 22 is extinguished. For purposes of the evaluation, the propagation of this melt front 28, and therefore the size (width and depth) and shape of the melt pool 26, over time is recorded, as are the welding parameters used. Depending on the particular type of welding technique, such parameters may include weld current, the use of any fluxes, the position of the torch 22 relative to the surface 24, etc., as would be appreciated by those skilled in the art.

Figure 4:
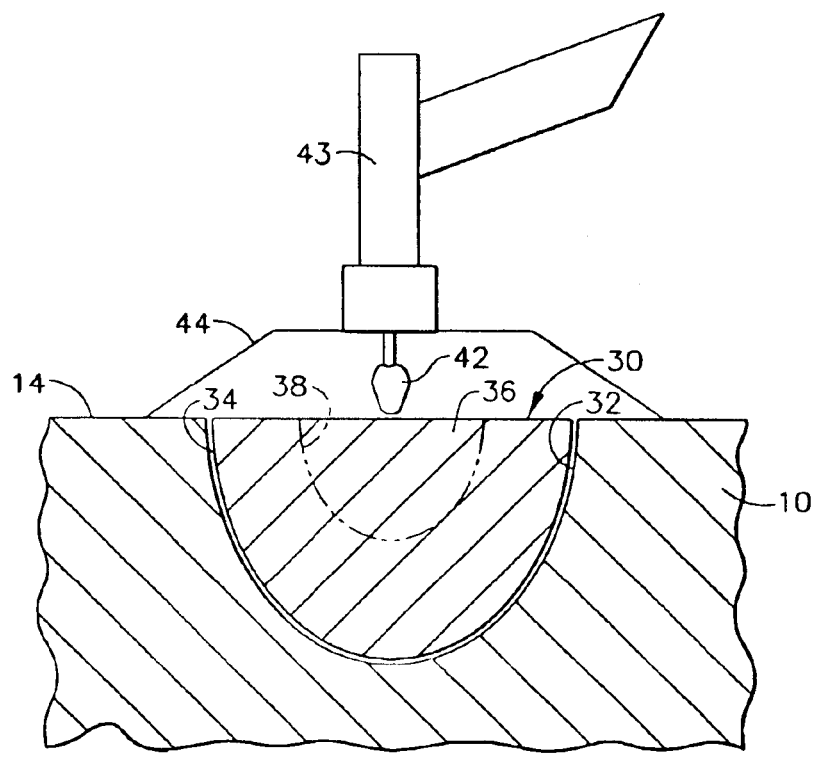

The body 20 is preferably formed of the same alloy as that of the component 10 intended to be repaired though, as will become apparent from the following discussion, the body 20 can be formed of a different material as long as the weld melt front 28 will propagate through the body 20 in a manner similar to a weld melt front 38 caused to propagate through the component 10 under similar welding conditions (FIG. 4). As such, the term same metal alloy as used herein encompasses alloys that are sufficiently similar in terms of composition and microstructure to have similar welding properties.

Assuming that the body 20 has isotropic properties, the melt pool 26 and melt front 28 will generally have circular shapes at the surface 24 of the body 20. Depending on the welding technique used, the melt pool 26 and melt front 28 may also have semispherical shapes, though a greater aspect ratio (depth vs. width) will typically be preferred for repairing many surface defects, such as the defect 12 shown in FIG. 2. Therefore, while various welding techniques may be used to carry out the invention, electron beam or laser welding techniques will be typically preferred to repair defects that require a greater aspect ratio. For conditions in which a manual welding operation will be used, TIG and PTA welding techniques can be used. With the development of organic fluxes, the aspect ratio (depth vs. width) of a weld melt pool formed by TIG can be increased by up to 300%, making TIG a suitable candidate for many types of defects. With the TIG technique represented in FIG. 1, the arc is preferably initiated with the TIG machine in panel mode, and the arc current is thereafter maintained constant.

A suitable technique for observing the propagation of the melt front 28 and the size of the melt pool 26 is metallographic sectioning. With the evaluation represented by FIG. 1, a data base can be established by which the size and shape of the melt pool 26 can be recorded for any number of welding times for the welding technique and parameters used, and the sizes and shapes of the melt pools 26 and their correlated weld times cataloged. Using this same technique, the data base can be expanded to include melt pool sizes and shapes correlated with welding times for a variety of different alloys, welding techniques and parameters.

In FIG. 2, a surface region 16 of the component 10 surrounding the defect 12 has been designated. To encompass the entire defect 12, the size and shape of the surface region 16, as delineated by its boundary 18, are very nearly the same as the weld melt pool 26 at the farthest extent of the weld melt front 28 in FIG. 1. The surface region 16 is designated for removal, by which the defect 12 is eliminated from the surface 14 of the component 10 to yield a cavity 32 shown in FIG. 3. Various techniques can be used to remove the surface region 16, including the use of air tools equipped with carbide cutters to rough out the cavity 32, followed by the use of a precision cutter so that the size (width and depth) and shape of the cavity 32 closely correspond to that of the surface region 16, and are therefore very nearly the same as the weld melt pool 26 at its farthest extent in FIG. 1. In preparation for the welding operation represented in FIG. 3, the surface 14 of the component 10 and the surface of the cavity 32 preferably undergo a surface treatment to remove any oxides and other surface contaminants that could interfere with the welding operation.

Figure 3:
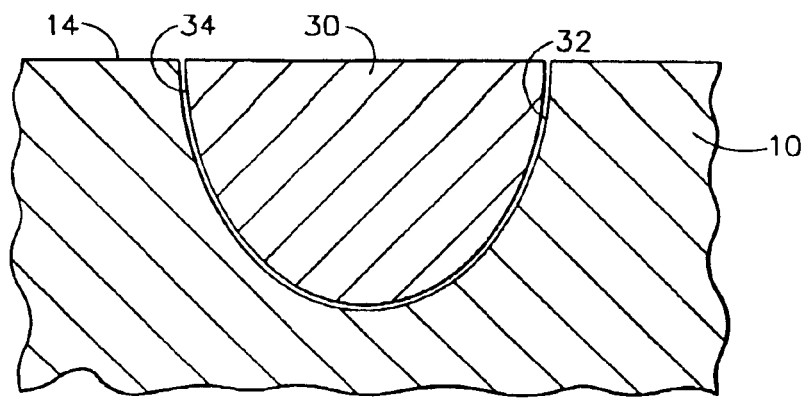
FIGS. 3, 4 and 5 represent steps performed to repair the defect of FIG. 2 by removing surface material in and around the defect to form a cavity of a predetermined size, placing a correspondingly-sized filler insert in the cavity, and then performing a welding operation that is controlled to melt the insert and a limited portion of the component immediately adjacent the insert.

FIG. 3 shows the placement of a filler insert 30 in the cavity 32 formed in the surface 14 of the component 10. As shown, the insert 30 is slightly undersized relative to the cavity 32. For example, the insert 30 may be sized to provide a diametrical clearance between the outer surface 34 of the insert 30 and the cavity 32 of about one to five percent of the diameter of the insert 30, so as to facilitate placement of the insert 30 in the cavity 32. According to the invention, suitable materials for the insert 30 include alloys that exhibit mechanical and thermal properties that are comparable to the material of the component 10, e.g., a nickel-base alloy if the component 10 is formed of a nickel-base superalloy. In this sense, the insert 30 can be viewed as being formed of the same metal alloy as the component 10, in that a weld melt front 38 (FIG. 4) will propagate through the insert 30 similarly to the weld melt front 28 that propagated through the body 20 during the evaluation, as long as similar welding conditions are used. In a preferred embodiment, the insert 30 is modified to be more ductile and have a lower melting temperature than the alloy of the component 10. As known in the art, suitable alloying constituents for this purpose include boron and silicon.

FIG. 4 represents the process of welding the insert 30 to the component 10 by heating the insert 30 with a torch 42 operating at essentially the same parameters as those used to perform the initial evaluation represented in FIG. 1. To ensure consistent placement of the torch 42 relative to the component surface 14 under widely variable conditions, the TIG welder 43 is shown as being supported on a rigid support 44. As with the body 20 of FIG. 1, a weld melt pool 36 has developed in the insert 30 as the result of the outward propagation of the weld melt front 38 through the insert 30 from a point nearest the torch 42. Because of the data acquired during the evaluation of the body 20, the size and shape of the weld melt front 38 at any given time can be accurately estimated on the basis of the time that has elapsed since the start of the welding operation. Furthermore, because the size of the insert 30 is known, the time required for the melt front 38 to reach the outer surface 34 of the insert 30 can also be accurately predicted. In addition, because the size and shape of the insert 30 and the placement of the torch 42 coincide with the size and shape of the melt pool 26 and torch placement of FIG. 1, the welding operation can be performed such that the melt front 38 arrives at the entire outer surface 34 of the insert 30 nearly simultaneously.

Figure 5:
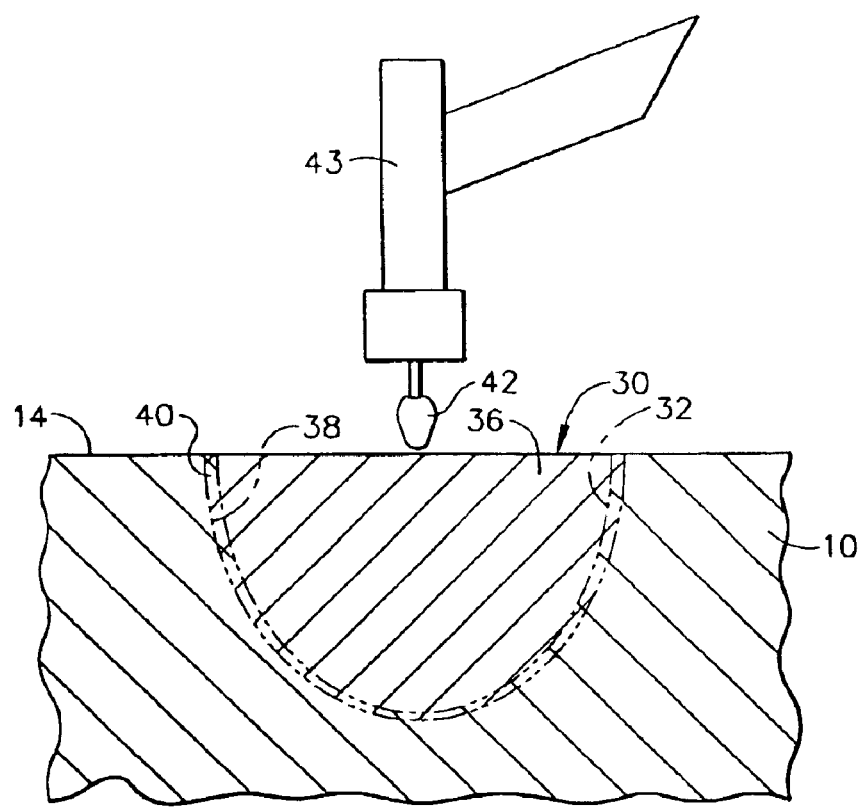

In accordance with a preferred aspect of the invention represented in FIG. 5, the melt front 38 is allowed to propagate to a substantially uniform depth into the surface of the cavity 32, such that the melt pool 36 not only consumes the insert 30, but also advances into a limited portion 40 of the component 10 beneath the cavity surface, such that a metallurgical bond between the insert 30 and component 10. For this purpose, the torch 42 is permitted to operate for a very limited time beyond the time period required to form the melt pool 26 in FIG. 1, so that minimal melting of the component 10 occurs and therefore minimal intermixing occurs between the materials of the component 10 and insert 30. By minimizing intermixing, the likelihood of cracking during cooldown from welding and subsequent strain age cracking is significantly reduced.

Following the welding operation, the component 10 is allowed to cool in accordance with known practices to further reduce the risk of weld-induced cracking. In accordance with conventional practice, the component 10 may undergo a post-weld heat treatment to temper any heat affected zone (HAZ) that may have developed in the component 10 adjacent the insert 30, which is now in the form of a weldment that includes the portion 40 of the component 10 that was melted during welding. Finally, the surface 14 of the component 10 can be further conditioned as necessary using any suitable technique to remove any excess filler material and any surface contaminants left by the welding operation.

In view of the above, it can be appreciated that the repair method of this invention is conducive to developing a large catalog of inserts for the repair of a variety of alloys and defects of different sizes by individually evaluating the alloys so that multiple melt pool widths, depths and shapes are correlated with multiple weld times, and optionally for a variety of welding techniques and parameters. Based on this data, filler inserts can then be formed to have approximately the same widths, depths and shapes identified and correlated with the welding times, such that a particular filler insert can be selected from an assortment of inserts based on the alloy to be repaired, the size of the defect in the alloy, and the welding technique that will be used. Because the weld repair method of this invention minimizes mixing of the insert with the parent alloy of the component, the adverse effects of mixing are reduced, potentially allowing the inserts to be formed from a number of filler materials, including alloys that would otherwise be relatively incompatible with the alloy being repaired.

While the invention has been described in terms of a preferred embodiment, it is apparent that other forms could be adopted by one skilled in the art. Therefore, the scope of the invention is to be limited only by the following claims.

What is claimed is:

1. A weld repair method comprising the steps of:
   determining the development of a weld melt pool over time in a surface of a body formed of a metal alloy so as to correlate melt pool width, depth and shape with time for a set of welding parameters;
   removing a defect in a surface of a component formed of a metal alloy that may be the same or different than the metal alloy of the body, wherein removal of the defect creates a cavity in the surface having a width, depth and shape substantially the same as a melt pool width, depth and shape correlated with a time period during the determining step;
   placing a filler insert in the cavity having approximately the same width, depth and shape as the cavity so that an outer surface of the filler insert is juxtaposed to a surface of the cavity: and then
   heating the filler insert using the set of welding parameters and for the time period correlated during the determining step to melt the filler insert and form a metallurgically-bonded weld repair that fills the cavity.

2. A weld repair method according to claim 1, wherein during the heating step a melt front propagates through the filler insert toward the outer surface of the filler insert and arrives substantially simultaneously at the entire outer surface of the filler insert.

3. A weld repair method according to claim 1, wherein during the heating step a portion of the component beneath the surface of the cavity is also melted, the portion having a substantially uniform thickness.

4. A weld repair method according to claim 1, wherein the determining and heating steps are performed with an arc welder.

5. A weld repair method according to claim 1, wherein the determining and heating steps are performed with a high energy beam.

6. A weld repair method according to claim 1, wherein the metal alloy of the component is a superalloy.

7. A weld repair method according to claim 1, wherein the determining step comprises correlating multiple melt pool widths, depths and shapes with multiple time periods for the set of welding parameters.

8. A weld repair method according to claim 7, wherein the filler insert is one of a plurality of filler inserts formed to have widths, depths and shapes approximately equal to the multiple melt pool widths, depths and shapes for the set of welding parameters, the method further comprising the step of selecting the filler insert from the plurality of filler inserts.

9. A weld repair method according to claim 1, wherein the filler insert is formed of a second metal alloy that is more ductile than the metal alloy of the component.

10. A weld repair method according to claim 1, wherein the filler insert is formed of a second metal alloy that has a lower melting temperature than the metal alloy of the component.

11. A weld repair method according to claim 1, wherein the metal alloy of the component is a superalloy and the component is a casting or forging.

12. A weld repair method according to claim 11, wherein the component is a gas turbine engine component.

13. A weld repair method according to claim 1, wherein the determining step comprises determining the development of weld melt pools over time for a plurality of metal alloys so as to correlate melt pool width, depth and shape with time for the plurality of metal alloys for a plurality of sets of welding parameters.

14. A weld repair method according to claim 1, wherein the determining and heating steps comprise positioning a weld torch at a substantially identical fixed distance from the surface of the body and the surface of the component.

15. A weld repair method according to claim 1, wherein the heating step is performed for a time period correlated during the determining step.

16. The component repaired by the weld repair method according to claim 1.

17. A method of weld repairing a casting formed of a superalloy with a filler insert formed of a metal alloy that is more ductile and/or has a lower melting temperature than the superalloy, the method comprising the steps of:

heating a surface region of a cast body formed of the superalloy to determine the development of a weld melt pool over time in the superalloy and thereby correlate a melt pool width, depth and shape with a time period for a set of welding parameters;

fabricating the filler insert to have a combination of width, depth and shape approximately equal to the melt pool width, depth and shape correlated for the time period during the heating step;

removing a defect in a surface of the casting so as to create a surface cavity having a width, depth and shape approximately equal to the melt pool width, depth and shape correlated for the time period during the heating step;

placing the filler insert in the cavity so that an outer surface of the filler insert is juxtaposed to a surface of the cavity; and then welding the filler insert using the set of welding parameters and for the time period correlated during the heating step to melt the filler insert and form a metallurgically-bonded weld repair that fills the cavity, wherein a melt front propagates through the filler insert toward the outer surface of the filler insert and arrives substantially simultaneously at the entire outer surface of the filler insert, and a portion of the superalloy beneath the surface of the cavity is also melted, the portion having a substantially uniform thickness.

18. A method according to claim 17, wherein the heating and welding steps are performed with a manual arc welder.

19. A method according to claim 18, wherein the heating and welding steps comprise fixturing the torch to be a substantially identical fixed distance from the surface of the cast body and the surface of the casting, respectively.

20. A method according to claim 17, wherein the heating and welding steps are performed with a high energy beam.

21. A method according to claim 17, wherein the heating step comprises correlating multiple melt pool widths, depths and shapes with multiple time periods for the set of welding parameters.

22. A method according to claim 21, wherein the filler insert is one of a plurality of filler inserts formed to have widths, depths and shapes approximately equal to the multiple melt pool widths, depths and shapes for the set of welding parameters, the method further comprising the step of selecting the filler insert from the plurality of filler inserts.

23. A method according to claim 17, wherein the superalloy is a gamma-prime strengthened nickel-base superalloy.

24. A method according to claim 17, wherein the casting is a component of a gas turbine engine.

25. A method according to claim 17, wherein the subjecting step comprises determining the development of weld melt pools over time for a plurality of superalloys so as to correlate melt pool width, depth and shape with time periods for the plurality of superalloys for a plurality of sets of welding parameters.

26. The component repaired by the weld repair method according to claim 17.

* * * * *